United States Patent [19]

Dearling

[11] E Re. 29,639

[45] Reissued May 23, 1978

[54] SPRAY DISPENSING DEVICE

[75] Inventor: Harry S. Dearling, New York, N.Y.

[73] Assignee: Tobe Dearling, New York, N.Y.

[21] Appl. No.: 813,220

[22] Filed: Jul. 6, 1977

Related U.S. Patent Documents

Reissue of:

[64] Patent No.: 3,964,647
Issued: Jun. 22, 1976
Appl. No.: 557,320
Filed: Mar. 11, 1975

[51] Int. Cl.[2] ..... B67D 5/64
[52] U.S. Cl. ..... 222/174
[58] Field of Search ..... 221/309; 222/174, 182, 222/183, 398, 326

[56] References Cited

U.S. PATENT DOCUMENTS

| | | | |
|---|---|---|---|
| 2,940,641 | 6/1960 | Norrish et al. | 222/183 |
| 3,128,916 | 4/1964 | Picot | 222/182 X |
| 3,429,310 | 2/1969 | Jeffe et al. | 222/182 X |

*Primary Examiner*—Stanley H. Tollberg
*Attorney, Agent, or Firm*—Curtis, Morris & Safford

[57] ABSTRACT

A device to facilitate dispensing of a spray such as an insecticide, an antiseptic, a deodorizer, a floor wax or polish, or the like in relatively inaccessible or hard-to-reach areas. The device includes a carrier member within which is disposed a container of the desired spray. The spray container may be an aerosol container or one actuated by pumping action. The dispenser includes a depressible plunger mechanism cooperatively engaged with the carrier member to exert a compressive force on the spray container to actuate the spray dispensing mechanism to dispel the spray.

9 Claims, 8 Drawing Figures

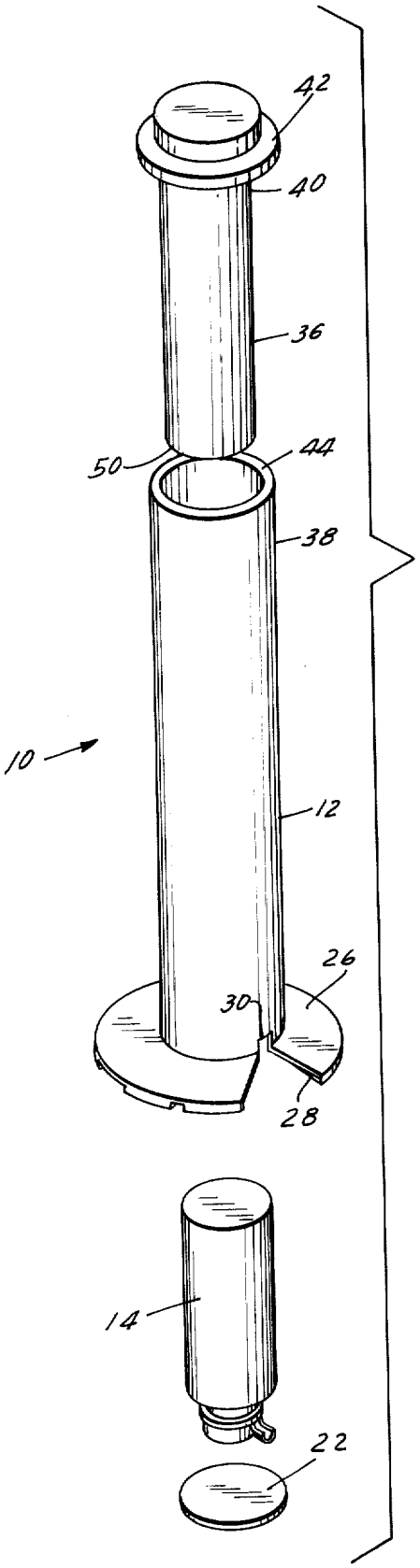
FIG. 1
FIG. 4
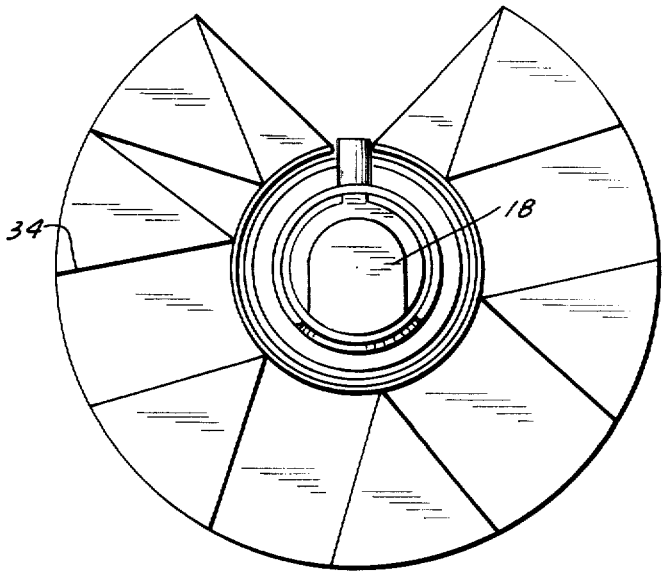

SPRAY DISPENSING DEVICE

Matter enclosed in heavy brackets [ ] appears in the original patent but forms no part of this reissue specification; matter printed in italics indicates the additions made by reissue.

The present invention relates to a spray dispensing device, and more particularly to a spray dispensing device which dispenses a measured or unmeasured quantity of a spray into relatively inaccessible or hard-to-reach areas.

Broadly, the present invention comprises a housing member adapted to house a spray container of a suitable dispensable composition such as an insecticide, antiseptic, deodorizing agent, wax, polish or the like, and includes cooperable plunger means therewith to facilitate dispensing of the spray with relative ease in relatively inaccessible areas.

such devices have a number of uses, including particularly to provide an effective spray device for use in dispelling a spray such as insecticide into corners and along the juncture of a wall and floor or a wall and ceiling and under furniture or appliances with relative ease. Heretofore, to spray such areas a person must stoop, kneel or stretch, or the spray device must be directed with the spray container held at a substantial angle. The resulting spray, especially when directed into corners, tends to spread out and is not concentrated on the desired area with the result that more of the spray than is necessary for the intended application must be utilized in order to insure that a sufficient quantity of the spray is directed at the desired areas.

Accordingly, it is an object of the present invention to provide a spray dispensing device for use in spraying relatively inaccessible areas with a minimum of effort and with a more efficient distribution of the spray on the intended area to be sprayed.

It is a further object of the present invention to provide such a spray projecting device which is relatively simple to construct and operate and which provides a more concentrated and effective means for directing a spray into relatively inaccessible areas.

These and other objects and advantages of the present invention will become more readily apparent after consideration of the following specification and accompanying drawing wherein:

FIG. 1 is an exploded perspective view showing one embodiment of the spray dispensing device of the present invention;

FIG. 4 is a bottom plan view with the retainer member removed for greater clarity;

Figure 2:
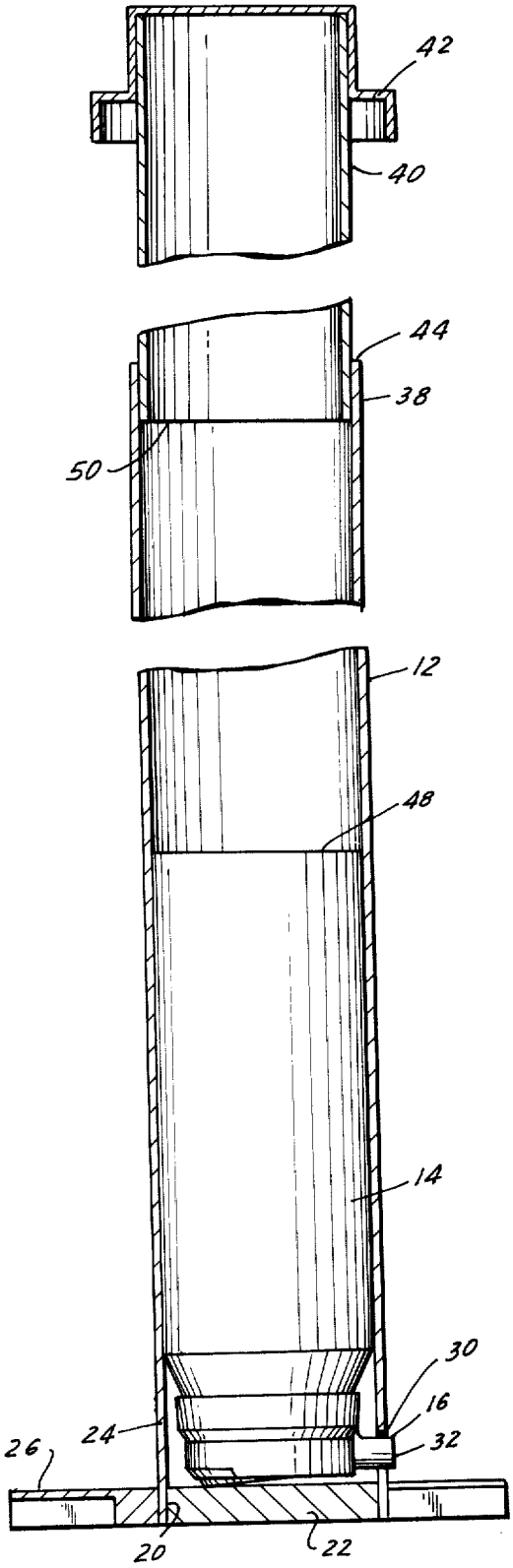
FIG. 2 is an elevational view, partly in section, showing the spray dispensing device of FIG. 1 in its unactivated state.

With reference to the drawing and particularly FIGS. 1 through 4, one embodiment of the spray dispensing device of the present invention 10 is shown and includes a cylindrical housing member 12 to retain a container 14 of the material desired to be sprayed. Container 14 may be an aerosol container, provided with an appropriate valve assembly 16 activated by a push-button or plunger 18. When plunger 18 is depressed, the valve assembly 16 opens to allow a spray from the container to be dispelled. While the present invention will be disclosed utilizing an aerosol container 14, it is expressly understood that container 14 may be of the non-aerosol type activated by a plunger which dispels the spray by a pumping action in a manner well known in the art.

Cylindrical housing member 12 is dimensioned to accommodate a container 14 by a close snug fit and, after container 14 is inserted within the housing 12, the lower open end 20 of cylindrical housing 12 is closed by an appropriate circular shaped plug 22 which is secured within opening 20 in any suitable manner, for example by a press fit.

The lower end 24 of cylindrical housing 12 includes a peripheral extending flange member 26 which is cut away in one segment, as at 28. Adjacent the cutout segment 28, housing 12 is notched, as at 30, to provide access for the valve housing 32 of valve assembly 16 of container 14. The undersurface of the flange 26 includes radial rib members 34 which provide a footing to maintain the housing 12 in a slightly elevated position from any surface upon which it is placed. This elevation affords sufficient clearance so that when the spray is dispelled from valve assembly 16 the spray has sufficient clearance to spread out and impinge on the desired area to be sprayed. In like manner, the cutout 28 in flange 26 also provides sufficient clearance to permit the spray to be dispelled from the container 14 without impinging on the flanged member.

Figure 3:
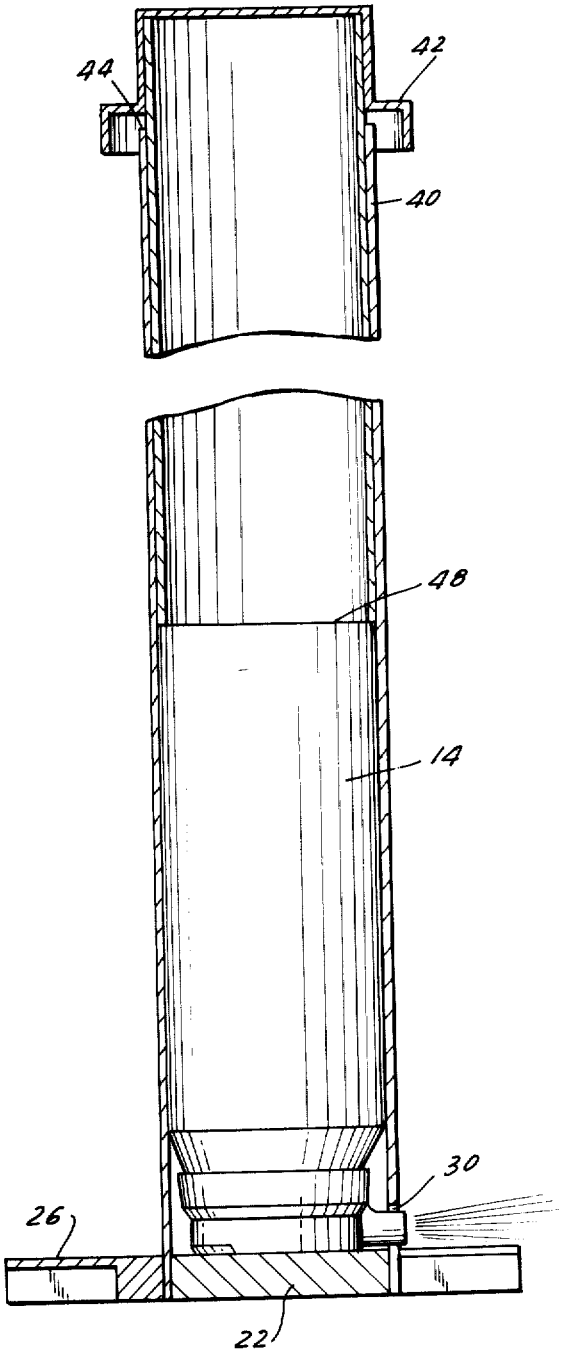
FIG. 3 is a view similar to FIG. 2 showing the spray dispensing device of the present invention in its spray or operative state.

Associated with the cylindrical housing member 12 is a cylindrical plunger member 36 which is telescopically received, for example with a light friction fit in the upper end 38 of cylindrical housing member 12. Plunger member 36 includes near its upper end 40 an extending flange 42 which acts as an abutment stop against the top surface 44 of cylindrical housing member 12. The axial length of plunger member 36 disposed within cylindrical housing 12 is slightly greater than the axial distance between the end 48 of the container 14 within cylindrical housing 12 and the end surface 44 of the cylindrical housing 12. Thus when the fragrance dispensing device 10 is assembled as shown in FIG. 2 the flange 42 of plunger 36 is spaced from the upper surface 44 of housing 12 and the end 50 of plunger 36 is spaced above the end wall 48 of container 14. When the device is activated, as shown in FIG. 3, plunger 36 is depressed so that end 50 of the plunger abuts against wall 48 of container 14 and the compressive force so exerted on the container 14 depresses the plunger element 18 to open the valve assembly 16 and allow the material within container 14 to be dispelled.

Thus in use, after the spray dispensing device 10 is assembled as shown in FIG. 2, the device is seated on a support surface such as a floor with the valve housing 32 of the spray container 14 directed to face the area to be sprayed, for example along the juncture of the floor and a wall, or the corner juncture of two walls and a floor, or under furniture or appliances, and plunger member 36 is depressed. Depressing the plunger member 36 dispels the spray from container 14 through the associated valve assembly so that the spray readily impinges on the desired area.

Reference is now made to FIGS. 5 through 8 for an alternate embodiment of the spray dispensing device of the present invention. In this embodiment elements which are the same as elements described in the embodiment of FIGS. 1 through 4 will be designated by the same numeral.

In the embodiment of FIGS. 5 through 8 the spray dispensing device 10' is shown to include a housing member 60 to retain a container 14 of the desired spray. The housing 60 includes a substantially frusto-conically shaped segment 62 having an axially disposed slot 64 therein with the segment 62 terminating in a flanged base plate assembly 66.

Figure 5:
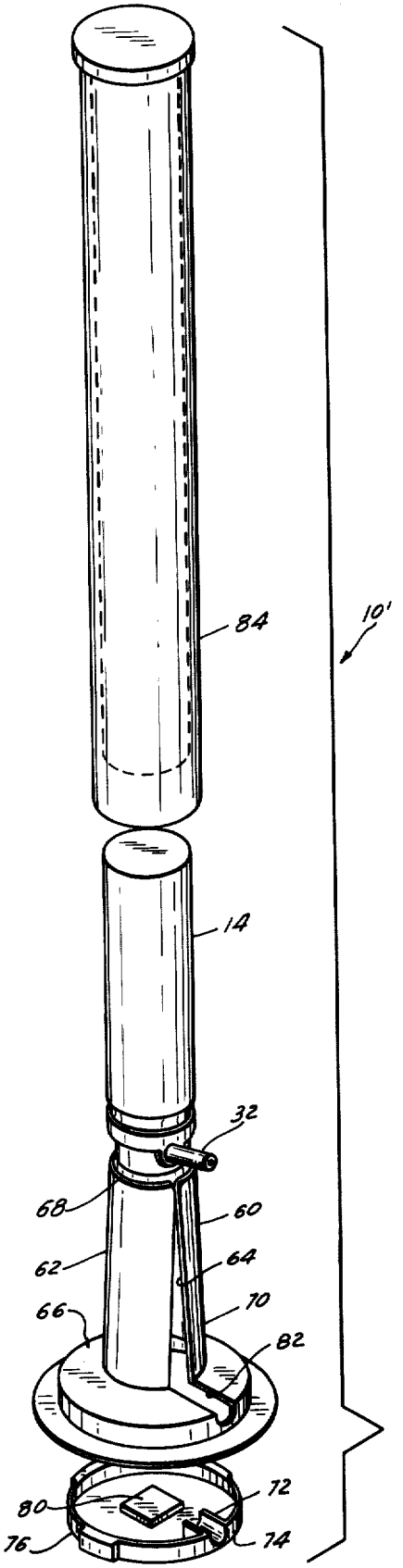
FIG. 5 is an exploded perspective view showing another embodiment of the spray projecting device of the present invention.
Figure 6:
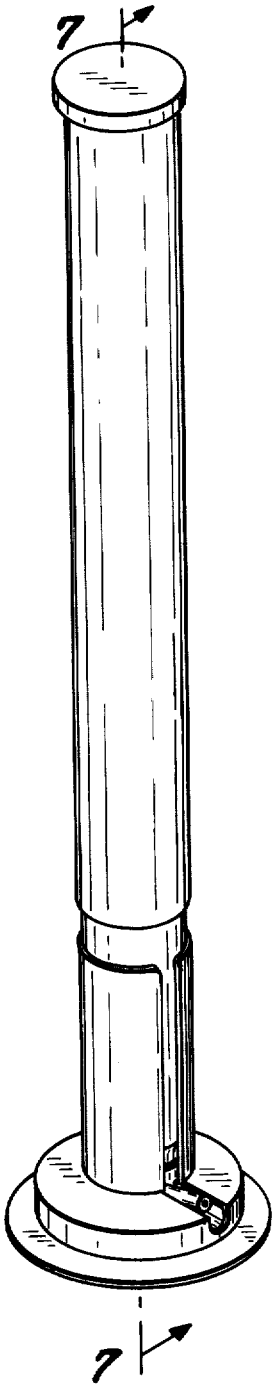
FIG. 6 is a perspective view of the spray dispensing device of the embodiment of FIG. 5 in its unactivated state.

The segment 62 is constructed from a somewhat resilient material, for example plastic, and is dimensioned to have a smaller internal diameter at its upper end 68 than at its lower end 70 adjacent the flanged base plate 66. Thus in the unassembled position, as shown in FIG. 5, the inherent resiliency of the plastic material and the physical construction of the housing 60 forms a housing member which tapers slightly so that the opening of the slot 64 progressively decreases from its widest part adjacent the juncture with base plate 66 at the lower segment of housing 60 to the upper end 68.

Figure 7:
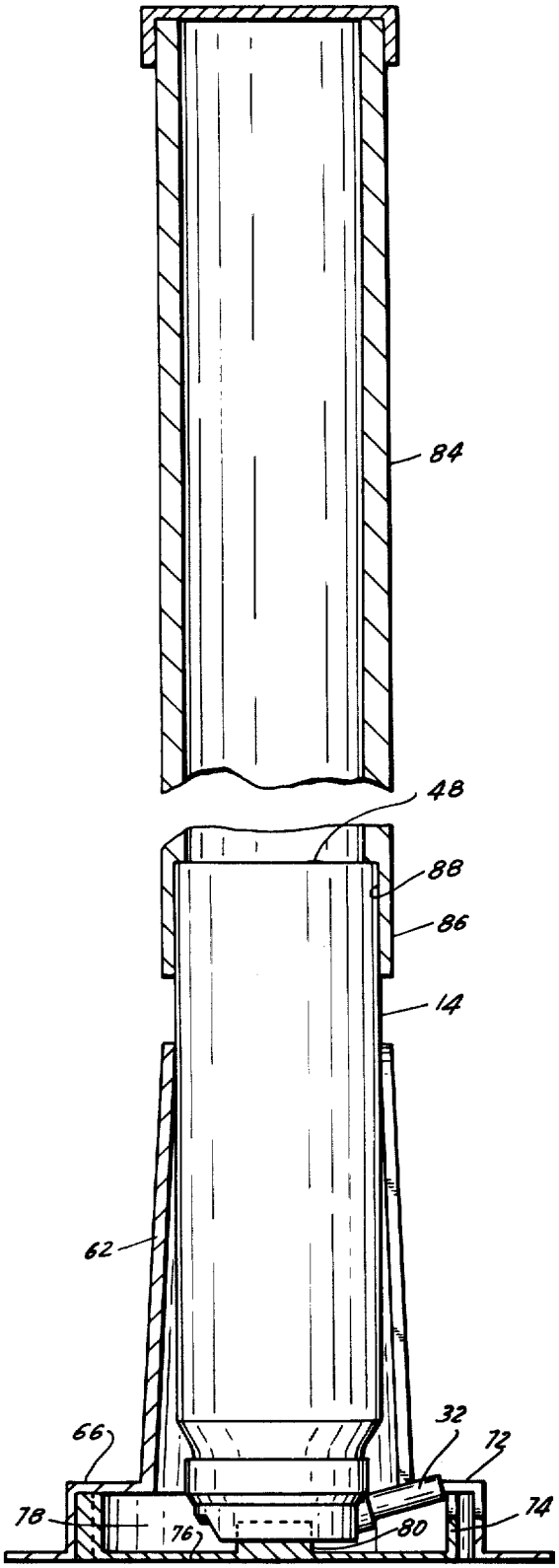
FIG. 7 is a sectional view taken on the line 7—7 of FIG. 6.
Figure 8:
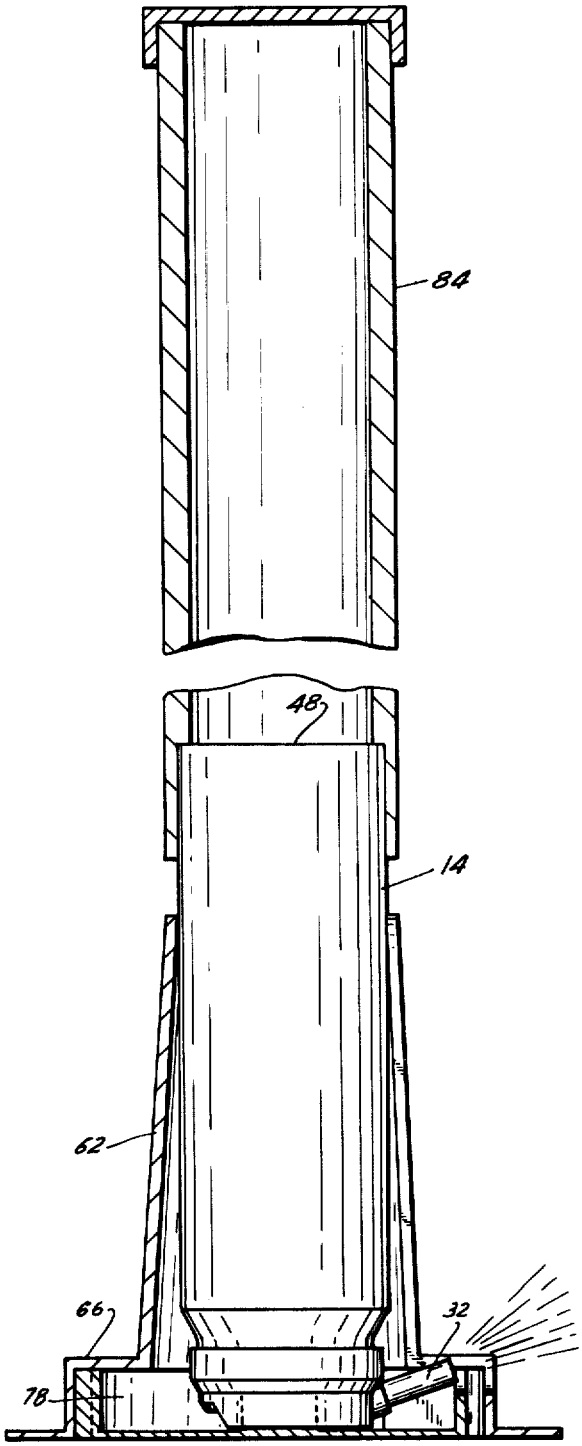
FIG. 8 is a view similar to FIG. 7 showing the device in its spray or operative state.

As best seen in FIGS. 7 and 8, the flanged plate assembly 66 comprises an upper surface 72, a depending peripheral wall surface 74 and a lower base plate surface 76 to define a container receiving volume 78 therein. Centrally located on the upper surface of base plate 76 is an elevated pad member 80 upon which rests the actuating plunger 18 of the spray container 14.

As in the embodiment of FIGS. 1 through 4, a valve housing access opening 82 is provided within the flanged base plate assembly 66 with the valve housing access opening being in register with the slot 64 formed in the housing member 62.

To assemble the device the container 14 is inverted and inserted within the housing member 62 with the valve housing 32 of container 14 positioned within the access slot 64. The internal diameter of housing 62 at its upper end 68 is less than the external diameter of the spray container 14 so that the housing is resiliently urged outwardly as the container 14 is inserted therein and the resilient action of the housing provides sufficient compressive force to hold the container 14 securely within the housing 62.

The actuating member for the embodiment of FIGS. 5 through 8 includes a substantially cylindrical sleeve member 84 which has a lower end segment 86 undercut along its inner periphery, as at 88, to form a shoulder 90 which seats against the end wall 48 of container 14. The internal diameter of sleeve 84 along the segment 88 is substantially equal to the external diameter of the container 14 so that sleeve 84 is retained on the end of container 14 by a light press fit. Alternatively, a screw thread form may be provided on the end of container 14 and a mating internal screw thread form may be provided along segment 88 of sleeve 84 to threadably engage the actuating sleeve member 84 on container 14.

Operation of the embodiment of FIGS. 5 through 8 is substantially the same as the operation of the embodiment of FIGS. 1 through 4. Thus by depressing sleeve member 84 a compressive force is imparted to the container 14 as the shoulder 90, or the threaded engagement between the sleeve 84 and container 14, forces the container against the pad member 84 to depress the operating plunger 18 and dispel the spray through the valve housing 32 and out the access slot 82.

It is thus seen that the present invention provides a spray dispensing device readily adaptable to dispense a measured quantity of a spray into relatively inaccessible or hard-to-reach areas.

What is claimed is:

1. A spray dispensing device for dispensing a spray comprising, in combination, a container for dispensing a quantity of a desired spray including valve means associated with said container and actuation means to operate said valve means to dispel a spray from said container, a first housing for said container comprising a substantially frusto-conically shaped segment within which is disposed said container, said container being disposed within said first housing and said first housing including an access opening therein to permit the spray when dispelled from said container to clear said housing, said housing segment including a tapered axially disposed slot therein along the extent of said segment to accommodate the valve housing of said container when said container is inserted therein and said segment being resilient to outwardly expand upon insertion of said container therein to frictionally grip and retain said container therein, means within said first housing to cooperatively contact the actuation means on said container, and second housing means cooperatively interrelated with said first housing means and movable from a first position wherein no compressive force is exerted on said container to a second position wherein a compressive force is exerted on said container thereby to exert a force on said container actuation means to dispel a spray from said container.

2. A spray dispensing device as defined in claim 1 wherein said frusto-conically shaped housing segment includes a flange member extending from one end and said access opening in said first housing being adjacent the juncture of said frusto-conically shaped segment and said flange member and in register with said access slot in said frusto-conically shaped segment.

3. A spray dispensing device as defined in claim 2 wherein said flange member includes a base segment which elevates said access opening above a surface on which said spray dispensing is placed thereby to provide clearance for the dispelled spray to impregnate the area desired to be sprayed.

4. A spray dispensing device as defined in claim 3 wherein said means within said first housing to cooperatively contact said actuation means on said container includes an elevated pad member on said base segment in abutting contact with said actuation means.

5. A spray dispensing device as defined in claim 1 wherein said second housing comprises a substantially cylindrical segment telescopically and frictionally engaged about the end segment of said container and movable between said first and said second positions.

6. *A spray dispensing device for dispensing a spray comprising, in combination,*

*a container for dispensing a quantity of a desired spray including valve means associated with said container*

*and actuation means to operate said valve means to dispel a spray from said container,*

*a housing for said container comprising a substantially frusto-conically shaped segment within which is disposed said container,*

*said container being disposed within said housing,*

*said housing including an access opening therein to permit the spray when dispelled from said container to clear said housing,*

*said housing segment including a tapered axially disposed slot therein along the extent of said segment to accommodate the valve housing of said container when said container is inserted therein and said segment being resilient to outwardly expand upon insertion of said container therein to frictionally grip and retain said container therein,*

*means within said housing to cooperatively contact the actuation means on said container wherein when a compressive force is exerted on said container said force acts on said container actuation means to dispel a spray from said container.*

*7. A spray dispensing device as defined in claim 6 wherein said frusto-conically shaped housing segment includes a flange member extending from one end and said access opening in said housing is adjacent the juncture of said frusto-conically shaped segment and said flange member and in register with said access slot in said frusto-conically shaped segment.*

*8. A spray dispensing device as defined in claim 7 wherein said flange member includes a base segment which elevates said access opening above a surface on which said spray dispensing device is placed thereby to provide clearance for the dispelled spray to impregnate the area desired to be sprayed.*

*9. A spray dispensing device as defined in claim 8 wherein said means within said housing to cooperatively contact said actuation means on said container includes an elevated pad member on said base segment in abutting contact with said actuation means.*

* * * * *